Nov. 25, 1969 J. W. WEIGL ET AL 3,480,962
FACSIMILE RECORDING SYSTEM
Original Filed Sept. 29, 1965
2 Sheets-Sheet 1

INVENTOR.
JOHN W. WEIGL
EDWARD FOREST
CAROL K. KELLER
BY
ATTORNEYS

Nov. 25, 1969 J. W. WEIGL ET AL 3,480,962
FACSIMILE RECORDING SYSTEM
Original Filed Sept. 29, 1965
2 Sheets-Sheet 2
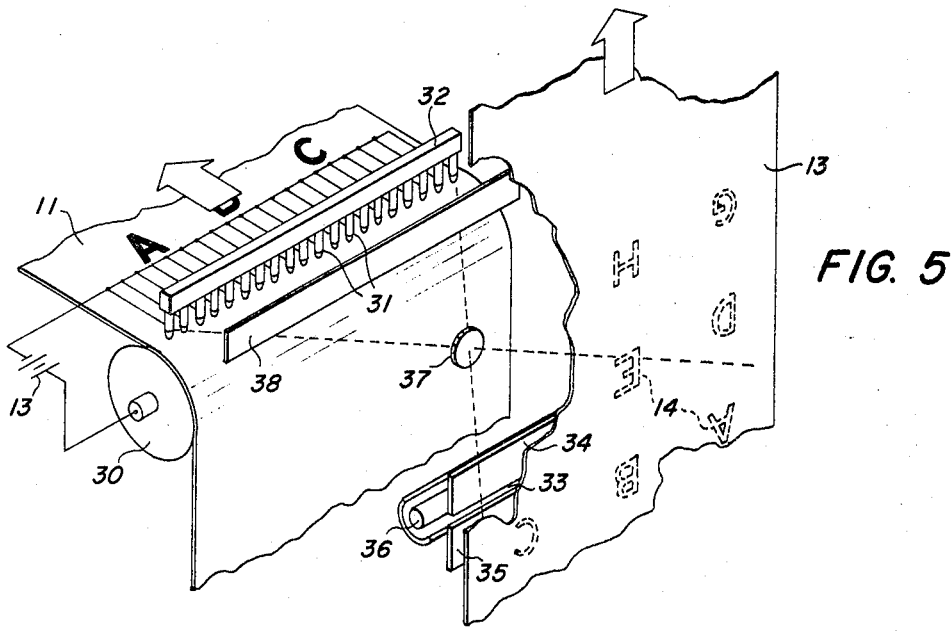
FIG. 5
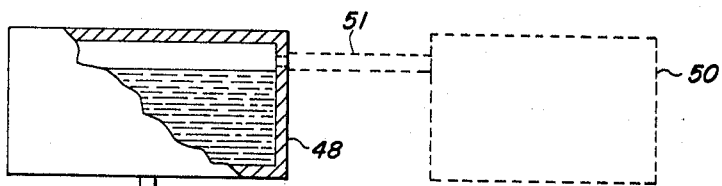
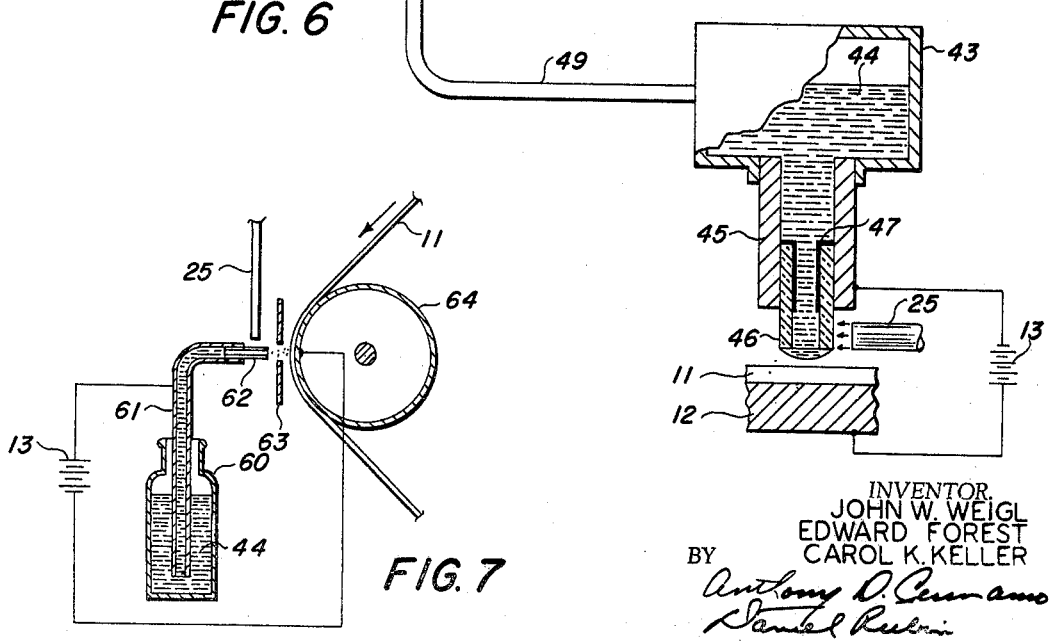
FIG. 6
FIG. 7
INVENTOR.
JOHN W. WEIGL
EDWARD FOREST
CAROL K. KELLER
BY
ATTORNEYS United States Patent Office 3,480,962
Patented Nov. 25, 1969

3,480,962
FACSIMILE RECORDING SYSTEM
John W. Weigl, West Webster, Edward Forest, Rochester, and Carol K. Keller, Webster, N.Y., assignors to Xerox Corporation, Rochester, N.Y., a corporation of New York
Continuation of abandoned application Ser. No. 491,256, Sept. 29, 1965. This application May 22, 1967, Ser. No. 640,424
Int. Cl. G01d *15/16, 15/18*
U.S. Cl. 346—1                                             11 Claims

ABSTRACT OF THE DISCLOSURE

Method and apparatus for producing graphic displays wherein the flow of a liquid ink having photoconductive properties is controlled by intermittently exposing the ink to light energy in response to intelligence information whereby the conductive properties of the ink are sufficiently altered to permit a constant electric field to impart motion to the ink.

BACKGROUND OF THE INVENTION

This invention relates to method and apparatus for facsimile recording onto a print receiving surface. More specifically, the invention relates to a facsimile printing system for liquid ink recording of intelligence signals transmitted as optical radiation.

Prior art devices for recording with liquid ink generally are of three basic types. A first type operates with physical contact between an ink fed stylus and a recording surface with the stylus being physically removable from the recording surface on receipt of an appropriate signal. Physical removal is difficult to control at high speeds and with a fast flow of intelligence requires a highly damped, relatively nonelastic mechanical system. The large amount of distortion-free power required to operate such a system at speeds of 10 kc. or higher results in high initial cost and a very low level of operating efficiency.

A second type is one in which an ink fed stylus is maintained in constant contact with a recording sheet and is moved relative thereto in order to record information. Like the last mentioned type, this provides a continuous mark on the recording surface at all times when the stylus and recording surface are in contact. This type has been largely limited in practical application to oscillograph use since mechanical complexity has been regarded as too prohibitive to control a continuously marking stylus through the tortuous configurations necessary for more sophisticated writing.

The last of the types is referred to as "ink spitters" and includes devices in which ink is transferred across a gap from a point or orifice onto a recording surface. They are generally responsive to an intermittently applied electrical signal or to a controlled pressure in the feed system. In those systems responsive to receipt of a voltage signal, it has been necessary to intermittently generate these signals of high enough voltage sufficient to overcome the inertia and surface tension effects associated with the ink and its capillary and both of which are extremely difficult at high frequency rates.

SUMMARY OF THE INVENTION

Now in accordance with the present invention, it has been discovered that when using liquid inks having photoconductive properties sensitive to actinic radiation and to which a constant field is applied, that the ink will flow selectively in response to receipt of a light modulated signal. Thus, in accordance herewith, a facsimile recording pen containing a quantity of photosensitive liquid ink is supported in an electrical field relative to a recording surface. When the pen is exposed to an optical signal of intelligence, light absorbed by contained photoconductive particles in the ink (or by the photoconductive insulating liquid medium) causes the liquid to become charged, evidently by injection of charges from the capillary electrode. The deposition is selective in response to receipt of the light transmitted intelligence signal and deposition is instantly interrupted when the light signal is removed.

Thus, it is an object of the present invention to provide a novel liquid ink recording system for facsimile recording.

It is a further object of the invention to provide a novel facsimile ink spitter selectively responsive to an intelligence signal transmitted in the form of actinic radiation.

It is a still further object of the invention to provide a facsimile recording liquid ink composition having photoconductive properties whereby ink spitting from a recording pen can be selectively controlled onto a recording member in response to a received signal of actinic radiation to which the ink composition is sensitive.

It is a still further object of the invention to provide novel liquid ink formulations for facsimile recording having photoconductive properties whereby its electrical resistivity is substantially reduced in the presence of actinic radiation.

DESCRIPTION OF THE DRAWINGS

Further objects and features of the invention will become apparent upon reading the following description in conjunction with the drawings wherein:

FIG. 5 is a schematic isometric of alternate apparatus for direct scanning of an image document;

FIG. 6 is an enlarged sectional elevation of a capillary recording pen as employed in the various embodiments hereof; and, FIG. 7 is a schematic variation of an apparatus arrangement for recording pens hereof.

DESCRIPTION OF THE PREFERRED EMBODIMENTS

Figure 1:
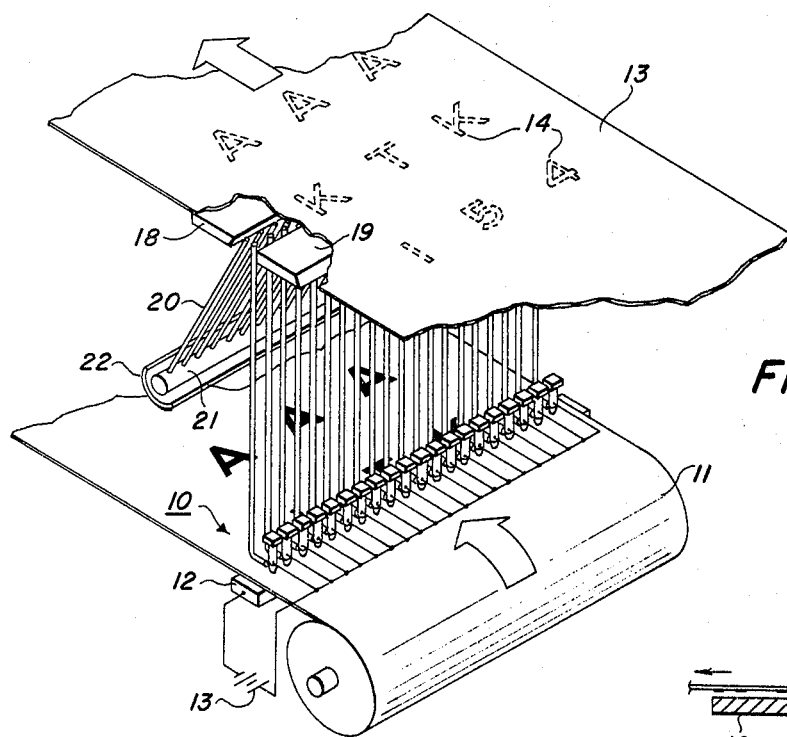
FIG. 1 is a schematic isometric view of an apparatus embodiment in accordance herewith to effect a facsimile reproduction from an original document.

Essential to the invention hereof is the ink composition which has light sensitivity to the extent that the composition by virtue of its liquid properties or the properties of contained particles becomes increasingly electrically conductive in the presence of light. Thus, as will be understood from the description below, the ink composition is contained in a capillary recording pen to which an electrical field is applied to an amplitude of incipient deposition. In the absence of a light signal the composition is sufficiently electrically insulating as to be retained in the capillary by surface tension or the like inherently imposed thereon. Application to the ink of a light signal, representative of intelligence to be recorded, irrespective of its origin whether it be a transduced computer output, the images from the surface of a scanned document, or the like, causes the electrical resistivity of the liquid ink to be reduced from about $10^9$ ohm-centimeters to $10^7$ ohm-centimeters and below. This increased conductivity causes the ink to receive an accelerating charge whereby to discharge from its capillary onto a closely spaced recording member supported within the applied field. The period of deposition has been found to correspond accurately to the duration of the applied radiation as to become instantly interrupted when the radiation signal is removed. Accordingly, the ink composition should preferably be colored, or contain a color former or otherwise be capable of marking a receiving sheet. It should likewise contain quantities of photoconductive materials whereby its conductivity can be selectively controlled in response to an applied signal of actinic radiation. Suitable materials, include by way of example two grams of the following pigments, when formed as a suspension in 25 ml. of Sohio solvent 2443, an aliphatic hydrocarbon dielectric liquid.

ance of light transmission through the respective optics such that the ink in the corresponding pen will interrupt its flow ad be restored to its more resistive state. As can be appreciated, each of the recording pens in the array are closely juxtaposed to each other as are their individual corresponding light pipes 25 to provide optimum and maximum coverage of the document surface as well as the printout onto the recording member 11.

Because of direct signal transmission by which an absence of image on document 13 causes ink deposition from a corresponding recording pen 10 onto recording member 11, there generally results a reversal reproduction

| Pigment Suspension | Applied Field (Approx.) and Capillary Polarity | Chemical Comp. |
| --- | --- | --- |
| Monolite Fast Blue GS | ±8,600 volts/cm | A mixture of alpha & beta metal-free phthalocyanine; Arnold Hoffman Co. |
| Monolite Fast Blue W 0.1% trinitrofluorenone by weight of pigment. | ±5,000 volts/cm | Do. |
| Quindo Magenta RV 6803 | do | A substituted quinacridone; Harman Colors Co. |
| Indofast Brilliant Scarlet | do | 3,4,9,10-bis(N,N'-(p-methoxyphenyl)-imido)-perylene; Harmon Colors Co. |
| Diane Blue | ±7,200 volts/cm | 3,3'-methoxy-4,4'-diphenyl-bis (1''-azo-2''-hydroxy-3''-naphthanilide; Harmon Colors Co. |
| Yellow 96 | ±5,600 volts/cm | 8,13-dioxodine-phtho-(1,2-2',3')-furan-6-carboxy-4''-methoxyanilide. |

Additional disclosure of yellow 96 is contained in application Ser. No. 421,377, filed Dec. 28, 1964, in the name of L. Weinberger and assigned to the assignee of this application. Of those materials named, Diane Blue, Monolite Fast Blue sensitized with trinitrofluorenone, and Indofast Brilliant Scarlet showed superior responsiveness.

Figure 2:
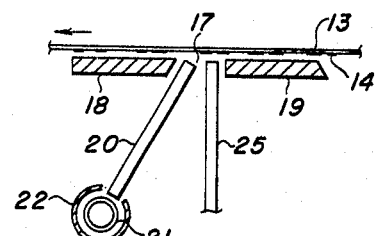
FIG. 2 is an enlarged side elevation of the document scanning mechanism employed in FIG. 1.

Referring now to FIGS. 1 and 2, there is illustrated an array of linearly aligned closely adjacent capillary recording pens 10 containing a quantity of liquid ink as described above and terminating contiguously spaced to the surface of a continuously advancing recording member 11 on which the ink is to be selectively deposited. Extending beneath the recording member parallel and at least coextensive with the array of recording pens is an electrode platen 12 which is electrically coupled to the recording pens from potential source 13. The amplitude of the applied field from source 13 can vary as shown above depending on the particular properties of the selected ink composition and the intensity of the radiation to be transmitted as a signal. Generally, the applied field is of magnitude at or below the level of incipient deposition as to impart acceleration to the ink when its resistivity is reduced by the applied signal.

The signal for actuating ink deposition from the individual recording pens in accordance with this embodiment emanates from a moving original document 13 containing images 14 which are caused to move past a scanning slit 17 extending laterally thereacross and defined by spaced apart plates 18 and 19. As the document advances across the slit the image surface thereof is continuously illuminated by a plurality of closely adjacent fiber optic light pipes 20 receiving light from transversely extending lamp member 21 partially enclosed by shield member 22.

The illuminated surface of the document is reflected into a plurality of corresponding fiber optic light pipes 25 which extend from close proximity to the document surface into an emission position relative to the discharge end of each of the pens as will be more fully described in connection with FIG. 6 below. Accordingly, as the illuminated document advances, each incremental area thereof is scanned by a light pipe 25. In the absence of sensing an image 14 a light signal is transmitted causing ink deposition from the recording pen onto the recording member 11. On the other hand, on sensing an image 14, there is a discontinuprintout, i.e., image areas 14 will be represented by an absence of an ink deposition on recording member 11 and vice versa. One method of rectifying the reproduction is by employing a black surfaced recording member 11 wtih a white ink contained in the capillaries.

Figure 3:
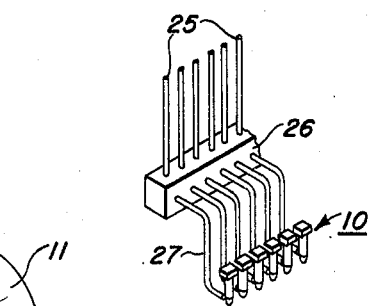
FIG. 3 is a schematic apparatus variation of FIG. 1 for effecting a reversed optical signal.

An alternative and preferable method for rectifying the signal in order to result in a positive-to-positive reproduction is illustrated in FIG. 3. In accordance therewith, the emission end of the fiber optics 25 are connected to an intermediate electronic light inverter 26, the output of which is connected via fiber optic light pipes 27 to the recording pens as above. By this means, a light input signal to the inverter will result in an absence of a light signal to the corresponding pen, whereas an absence of signal into the inverter will produce a light output signal thereto. This therefore results in a faithful positive-to-positive reproduction of the document surface containing image areas 14 and permits the use of conventional white papers with colored inks.

Figure 4:
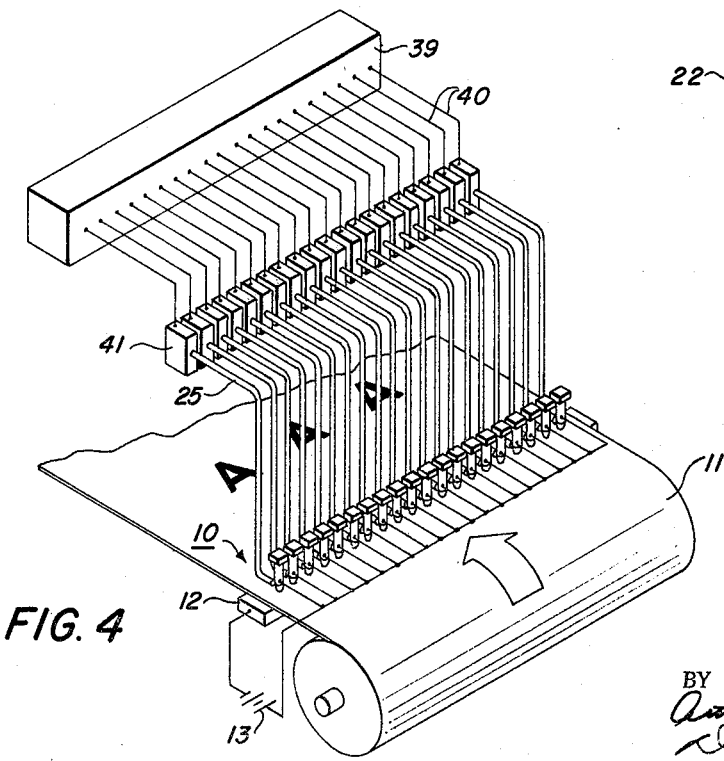
FIG. 4 is a schematic isometric view of an apparatus embodiment for reproducing from a source of intelligence voltage signals.

Recording is effected in FIG. 4 similarly as above and differs from the previous embodiments in that the originating signal source can be other than optical. As here shown, the signal source 39 can be the output of various electronic or sonar devices such as a computer, sound recording, or the like. The output of the source includes a plurality of individual leads 40 corresponding to the respective recording pens in the array and each of the leads is connected to apply a signal to the transducer 41 whereat the voltage signal from the source is converted to a light output signal connected to light pipes 25. Thereafter, the apparatus is operable as before.

In FIG. 5 the use of light pipes is omitted and the recording member 11 advances continuously over a conductive roller 30. An electrical bias is connected via potential source 13 to an array of recording pens 31 to which ink is supplied from a manifold reservoir 32. An original copy sheet 13 is caused to continuously advance past an exposure slit 33 formed between transverse plates 34 and 35 and at which illumination from lamp 36 illuminates the advancing portions of the copy surface. Instead of the fiber optic members employed as in the embodiment of FIG. 1, the image 14 thereon in passing slit 33 is optically projected by means of objective lens 37 onto the array of recording pens 31 to effect a response similar to that described above. An opaque bar 38 extends transversely across the surface of the moving recording member to prevent stray light from impinging on the recording pens as might be caused by unwanted reflection.

By means hereof, the optical image projection of the incremental areas of the original passing over exposure slit 33 selectively affects each of the pens 31 in the array to cause ink deposition selectively in response to received illumination. As in the first described embodiment, the operational effects will result normally in a reversal type reproduction whereby the opaque image areas 14 effect an interruption of ink flow from the pens while the light reflecting, non-image areas of the document will when optically transmitted sufficiently lower the conductivity of the ink composition to effect a deposit thereof onto the recording member 11.

Referring now to FIG. 6 there is disclosed an apparatus embodiment for individual capillary recording pens as is contained in either of the arrays 10 or 31. The pens as employed herein can comprise various structures, such as a hypodermic syringe for containing the quantity of ink composition and connected to a hypodermic needle having a transparent exposure surface at its terminal end against which the light signal can be applied. In the embodiment being described herein, each of the recording pens includes a reservoir 43 containing a quantity of the liquid ink 44 described above and connecting to an electrically conductive capillary 45 such as metal. Secured inwardly of the latter capillary extending downwardly out therefrom is a transparent capillary 46 of about 4 mil internal diameter of glass, plastic or the like and where if of a dielectric material includes an internal conductive coating 47 by which charge can be conducted to the ink.

In order to maintain each of the reservoirs adequately supplied with ink for its corresponding recording pen, there is provided a master reservoir 48 having a plurality of individual conduits 49 connecting to each of the individual reservoirs 43. To insure adequate pressure head on the ink composition as to overcome surface tension forces when subjected to the illumination through its respective light pipe, a hydraulic pressure may optionally be supplied into the master reservoir from a pneumatic air supply 50 connected thereto via a conduit 51.

The terminal lower open end of the recording capillary is supported a distance X from the surface of the recording paper 11 of approximately 1 to 3 mils, usually about 2 mils, with ink completely filling the vertical bore of capillary 46 from the reservoir 44 to the terminal tip thereof.

A constant field is applied from potential source 13 between capillary 45 and the supporting base 12 or 30 of the recording member with the field maintained at a level as aforesaid at which no ink flow occurs in the absence of the radiation transmitted via light pipe 25. The light pipe 25 is about the same or less than the cross-sectional dimension of capillary 46, e.g., 4 mils, to prevent the extraneous light from being directed elsewhere than where intended. The instant a radiation signal is transmitted via the light pipe, it is emitted from the end thereof against the lower transparent section of capillary 46 to render the ink composition therein sufficiently electrically conductive at that instant, charge is transmitted thereto from capillary 45 and conductive coating 47. This initiates ink flow which deposits onto paper 11 while discontinuance of the optical signal immediately reverts the ink composition to its more electrically resistive state causing an instantaneous interruption of ink deposition therefrom.

In FIG. 7 there is shown a slightly different physical arrangement from that shown above, in which there is a continuous ink reservoir 60 containing ink 44 with the lower ends of the array of electrically conductive capillaries 61 immersed therein. The upper end of each capillary terminates in a transparent extension 62 supported opposite slotted mask 63 laterally spanning the surface of the passing image receiving sheet 11 on conductive backing roller 64. On receipt of a light signal through light pipe 25, ink contained at the end of capillary 62 is accelerated across the gap through the slotted mask onto the surface of image receiving sheet.

By the above description there is disclosed novel method and apparatus for a liquid ink facsimile recording system discriminately responsive to a received optical signal for the selective deposition of ink onto a recording sheet. In accordance herewith, the ink composition is characterized by having photoconductive insulating properties that becomes increasingly conductive upon exposure to actinic radiation to which its photoconductor component is sensitive. By containing quantities of this ink in a plurality of closely spaced capillary recording pens, each of the pens subjected to a constantly applied electrical field can be rendered discriminately responsive to initiate ink flow onto a recording member on receipt of an optical signal representative of intelligence to be recorded. The apparatus can be adapted for either positive-to-positive or reversal reproduction and can be operable with optical signals having optical origin or whatever origin is known to those skilled in the art.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A method of controlling the flow of an ink having photoconductive properties at an aperture comprising:
    (a) supplying a liquid ink having photoconductive properties to an aperture,
    (b) applying an electrical potential to said ink at said aperture,
    (c) selectively illuminating said ink at said aperture to modulate the flow of said ink within the electrical field established by said potential.

2. The method of claim 1 in which said ink comprises a suspension of photoconductive pigment in an electrically insulating liquid.

3. A method of ink recording of intelligence information comprising the steps of:
    (a) supporting a capillary containing ink having photoconductive properties in an applied electric field and closely spaced to a recording surface; and,
    (b) transmitting intelligence in the form of optical signals to the ink in said capillary to effect ink discharge therefrom onto said recording surface in response to radiation received in said signal.

4. The method according to claim 3 in which said ink comprises a suspension of photoconductive pigment in an electrically insulating liquid.

5. The method according to claim 4 in which said applied electric field is at least 5000 volts/cm.

6. A facsimile recording apparatus comprising in combination:
    (a) an open-ended capillary containing a quantity of liquid ink having photoconductive properties and arranged with said open end terminating adjacent the surface of a recording member on which a recording is to be made;
    (b) an electrode supported aligned with the open end of said capillary on the side of the recording member opposite therefrom;
    (c) potential means connected to apply an electric field between said electrode and the ink in said capillary; and
    (d) transmitting means for transmitting in the form of radiation intelligence to the ink in said capillary signals to be recorded to effect in response to the radiation in said signals and ink flow from said capillary onto said recording member for the duration of each radiation transmitted signal.

7. Apparatus according to claim 6 in which there is included an array of said capillaries and means to effect relative movement between the recording member and said capillary array.

8. Apparatus according to claim 7 in which said transmitting means includes a plurality of light fibers each aligned to separately transmit radiation to a different capillary of said array.

9. Apparatus according to claim 7 in which there is included a signal source to emit voltage signals of intelligence to be recorded and means to transduce said voltage signals to radiation signals to be transmitted by said transmitting means.

10. Apparatus according to claim 7 in which there is included means to scan the image surface of an image bearing document to form the intelligence input to said transmitting means.

11. Apparatus according to claim 10 in which there is included light-inverter means intermediate said scan means and said transmitting means to invert the radiation signal input to said transmitting means.

References Cited

UNITED STATES PATENTS

| 2,556,550 | 6/1951 | Murray | 101—426 |
| 3,270,637 | 9/1966 | Clark | 95—1 |
| 3,308,475 | 3/1967 | Bean | 346—140 |

RICHARD B. WILKINSON, Primary Examiner

JOSEPH W. HARTARY, Assistant Examiner

U.S. Cl. X.R.

346—140